UNITED STATES PATENT OFFICE.

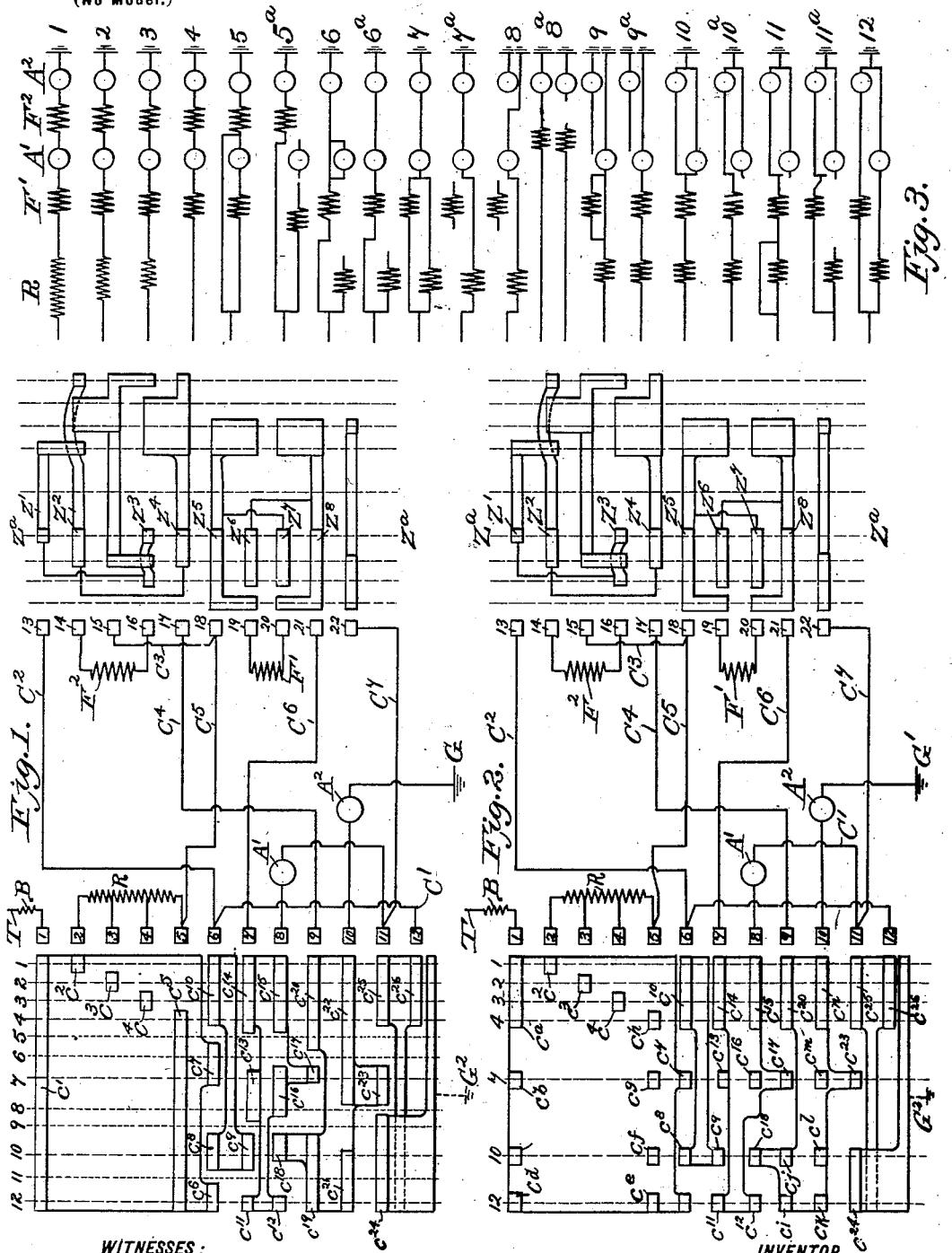

FRANK A. MERRICK, OF JOHNSTOWN, PENNSYLVANIA, ASSIGNOR TO THE JOHNSON COMPANY, OF PENNSYLVANIA.

ELECTRIC-MOTOR CONTROL.

SPECIFICATION forming part of Letters Patent No. 645,116, dated March 13, 1900.

Application filed April 19, 1899. Serial No. 713,690. (No model.)

*To all whom it may concern:*

Be it known that I, FRANK A. MERRICK, of Johnstown, in the county of Cambria and State of Pennsylvania, have invented a new and useful Improvement in Electric-Motor Control, of which the following is a full, clear, and exact description, reference being had to the accompanying drawings, which form a part of this specification.

This invention has relation to a system of control for electric motors, and has for its object generally the provision of a method of accelerating and regulating a plurality of motors by a series of gradual changes effected in the motor-circuit, whereby its resistance is decreased and the strength of the fields is varied in proportion to the increase in counter electromotive force.

The invention is especially designed for operation in connection with electric-railway motors, but may be used for other purposes.

Generally described the invention consists in a method of control wherein the motors are started in a position of maximum resistance, being in series as a whole, and are gradually shifted to a position of least resistance or in parallel as a whole by intermediate changes in the circuit connections, whereby the field-windings are first connected in parallel with the armatures still in series and subsequently the armature-windings are coupled in parallel with the field-windings in series.

The invention may also involve the use of further changes intermediate those enumerated, whereby the condition of the circuit is more gradually changed, and it may also involve the use of artificial resistance to a limited extent, as at starting.

The invention further consists in certain combinations of steps, which will be hereinafter described, and pointed out in the appended claims.

Referring to the accompanying drawings, Figure 1 is a diagrammatic view showing two electric motors, a controller, a reversing and cut-out switch, and such parts of the wiring and connections as are necessary to illustrate the nature and operation of my invention. Fig. 2 is a similar view showing a modified form of controller. Fig. 3 shows the successive circuit connections made by the movement of the controlling-switch shown in Fig. 1. Positions Nos. 1, 2, 3, 4, 7, 10, and 12 of this figure also represent the successive circuit changes made by the controller shown in Fig. 2.

In the figures, $A'$ $A^2$ represent the armatures of the motors, and $F'$ $F^2$ the field-coils.

Squares 1 to 12 represent a series of fixed contact-brushes which form part of the controlling-switch and which are arranged to engage with a series of movable contacts, (designated by $c'$ to $c^{26}$.) These contacts may consist of contact-pieces secured to a rotary cylindric drum operated by a suitable hand-lever. Controller-switches of the same type of mechanical construction are well known in the art, and it is sufficient to show and describe the arrangement of the movable contacts. These contacts are divided into five groups, each of which is electrically disconnected from the other groups, but has all its individual contacts electrically connected. Contacts $c'$ to $c^7$, inclusive, constitute one group; contacts $c^8$ $c^9$ $c^{10}$ constitute a second group; contacts $c^{11}$ to $c^{17}$, inclusive, a third group; contacts $c^{18}$ to $c^{23}$, inclusive, a fourth group, and contacts $c^{25}$ and $c^{26}$ a fifth group. A further single contact $c^{24}$ is connected to ground through the shaft of the controller.

It will be noted that certain of the contacts while belonging electrically to one group with respect to position are within the lines of another group, so that certain of the brushes may engage with contacts of two adjacent electrical groups. Brushes 6, 7, 8, 9, and 11 are of this class. Certain of the contacts are also arranged to be bridged by the brushes in certain positions. The purpose of this described relation of the contacts will be better understood after the different positions of the controlling-switch have been examined.

B represents the coil of an electromagnetic arc interrupter or "blow-out" through which the current passes to the controller and motor circuit and which is connected to the brush 1.

R represents an artificial resistance which I prefer to insert in circuit when the motors are first started and which is connected between brushes 2 and 5 and also with brushes 3 and 4. Armature A' is connected between the brushes 8 and 10. Armature $A^2$ is connected to brush 11 upon one side and to ground upon the opposite side.

C' is a conductor which connects the brushes 6 and 12.

Z designates a group of moving contacts which form part of a combined reversing and cut-out switch, and squares 13 to 22 indicate the contact-brushes which coöperate with such contacts. This switch forms no part of the present invention further than it is necessary to employ some switch of this character, and it need not, therefore, be described in detail. For the purpose of tracing out the circuits hereinafter it will be assumed that the brushes 13 to 22 are in engagement with those contacts Z which are on the vertical line $Z^a$ and which are further designated as $Z'$ $Z^2$, &c., to $Z^8$, respectively. Brush 13 is connected to brush 6 of the controller by conductor $C^2$. The field-coils $F^2$ are connected between the brushes 14 and 16. Brush 15 is connected to brush 18 by a conductor $C^3$. Brush 17 is connected to brush 9 by conductor $C^4$. Brush 18 is connected to brush 5 by conductor $C^5$. Field F' is connected between brushes 19 and 20. Brush 21 is connected to brush 7 by conductor $C^6$, and brush 22 is connected to brush 11 by conductor $C^7$.

At the first position of the switch brushes 1, 2, 6, 7, 8, 9, 10, 11, and 12 are respectively engaged with the contacts $c'$ $c^2$ $c^{10}$ $c^{14}$ $c^{15}$ $c^{20}$ $c^{22}$ $c^{25}$ $c^{26}$ and the course of the current (assuming that the brushes 13 to 22 are in the position $Z^a$, as above stated) is as follows: from the trolley, through blow-out coil B, to brush 1, contacts $c'$ $c^2$, brush 2, resistance R, brush 5, connection $C^5$, brush 18, contact $Z^5$, contact $Z^7$, to brush 20, through field-windings F' to brush 19, to contact $Z^6$, to contact $Z^8$, brush 21, connection $C^6$, to brush 7, contacts $c^{14}$ $c^{15}$, brush 8, through armature A', brush 11, contacts $c^{25}$ $c^{26}$, brush 12, through connection C' to brush 6, through conductor $C^2$ to brush 13, to contacts $Z'$ $Z^3$, to brush 16, through field $F^2$ to brush 14, to contacts $Z^2$ $Z^4$, brush 17, connection $C^4$, brush 9, contacts $c^{20}$ $c^{22}$, to brush 10, through armature $A^2$ to ground G. It will be seen, therefore, that in this position the current flows through the blow-out coil, the artificial resistance, and the armatures and fields in series, so that the motor-circuit presents a maximum resistance. In the next three positions the only change made in the circuit is to gradually cut out the resistance R as brushes 3, 4, and 5 are respectively engaged with the respective contacts $c^3$ $c^4$ $c^5$, the resistance at the last position (No. 4) being entirely cut out of circuit. I prefer to employ these preliminary steps, wherein the resistance is gradually removed from the circuit as the counter electromotive force of the motors gradually increases, but they may be dispensed with, not, however, without the disadvantage of a considerable inrush of current at the start. In the fifth position the brush 6 is bridging onto the contact $c^7$ of the first group and the brushes 7 and 8 still engage the contacts $c^{14}$ $c^{15}$, the result being that the current divides, one part passing by brush 5 through the motors in series as before and the other part by brush 6, conductor $C^2$, brush 13, contacts $Z'$ $Z^3$, to brush 16, so that a shunt is thrown around one motor and the volume of current passing through the motor-circuit is considerably increased. The position $5^a$ (illustrated in Fig. 3) is a momentary position only, in which the circuit through the first motor is broken by the brushes 7 and 8 leaving the contacts $c^{14}$ and $c^{15}$ in passing to position 6. In this latter position the circuit through the field of the first motor remains open, but its armature is connected in shunt with the circuit by reason of the brush 9 bridging over onto the contact $c^{17}$ of the third group and the brush 11 engaging the contact $c^{23}$ of the fourth group, whereby the current after passing through $F^2$ divides, one part going by brush 9, contacts $c^{17}$ $c^{16}$, brush 8, through armature A', brush 11, contacts $c^{23}$ $c^{22}$, brush 10, through armature $A^2$ to ground, and the other part going direct to brush 10 and armature $A^2$ to ground. In passing from position 6 to position 7 the brush 9 entirely leaves contact $c^{20}$, thereby breaking the short circuit around armature A' and sending the current in series through the two armatures with the second field also in series therewith, the circuit through field F' remaining open by reason of the fact that brush 7 is not engaged with any contact. This is the position or circuit relation denoted by $6^a$. Positions 5, $5^a$, 6, and $6^a$ are temporary or "passover" positions and are passed over rapidly preparatory to establishing the connections shown by position No. 7 and effect a gradual decrease of circuit resistance. In position No. 7 brush 7 again becomes engaged with a contact ($c^{13}$) of the third group, and thereby reëstablishes the circuit through the first field. A portion of the current, however, passes from contact $c^7$ to brush 6 and conductor $C^2$ to and through the second field. The two currents meet in the contacts of the third group and pass through the two armatures in series to ground. It will be seen, therefore, that the two fields are in parallel with the two armatures in series, resulting in a decrease in the strength of the fields and an increased flow of current. In passing from position 7 to position 8 the brush 6 leaves the contact $c^7$, and thereby cuts the field $F^2$ out of circuit, the entire current passing by brush 5 through the field F' and armatures A' $A^2$ in series by the course heretofore traced. This gives the condition of the circuit shown at $7^a$. In position 8 the connections remain substantially as before, except that the brush 11 comes in contact with the contact $c^{24}$, and thus establishes a shunt to ground around the armature $A^2$ through the shaft of the controller. In passing from position 8 to position 9 the brush 11 leaves the contact $c^{23}$ entirely, and thereby cuts armature $A^2$ out of circuit. But one motor is now in circuit. When position 9 is reached, the brush 7 is bridging the contacts $c^9$ $c^{13}$, so that after the current has passed through the first field it divides, one path being from contact $c^8$, brush 6, &c., through the second field to the third group of contacts and thence through A', brush 11, contact $c^{24}$ to ground, and the other path being a short circuit around the second field by way of brush 8 to A', &c., (the brushes 8 and 9 bridging over onto the contacts $c^{16}$ and $c^{19}$ of the fourth group.) Passing from position 9, brush 7 leaves the contact $c^{13}$, thereby cutting out the shunt around the second field. The circuit is now in the condition shown at $9^a$—that is to say, fields F' F$^2$ are connected in series with armature A' and armature A$^2$ remains out of circuit. Positions $7^a$, 8, $8^a$, 9, and $9^a$ are temporary positions, preparatory to position 10. In position 10 the engagement of the brush 10 with the contact $c^{21}$ divides the current after it has passed in series through the two fields, one part passing by the brush 8 through A' to ground and the other part passing by brush 10 through A$^2$ to ground. The two fields are therefore connected in series with the two armatures in parallel. In passing from position 10 the brush 8 leaves the contact $c^{18}$, thereby cutting the first armature out of circuit. This gives the momentary condition shown at $10^a$. When position 11 is reached, the brush 6 bridges onto the contact $c^6$ of the first group, and thereby short-circuits F', the other connections remaining as at position $10^a$. Passing from position 11 the brushes 6 and 7 leave the contacts $c^8$ $c^9$, and thereby break the connection between F' F$^2$, and the entire current passes through F$^2$ A$^2$, as shown in position $11^a$. Positions $10^a$, 11, and $11^a$ are preliminary to making the final connections shown in position 12. In this position brushes 1, 5, 6, 7, 8, 9, 10, and 11 are respectively engaged with the contacts $c'$ $c^5$ $c^6$ $c^{11}$ $c^{12}$ $c^{19}$ $c^{21}$ $c^{24}$. The current divides at the brushes 5 and 6, one part passing by conductor C$^5$, brush 18, contacts Z$^5$ Z$^7$, brush 20, field F', brush 19, contacts Z$^6$ Z$^8$, brush 21, conductor C$^6$, brush 7, contacts $c^{11}$ $c^{12}$, brush 8, armature A', and brush 11 to ground, and the other part passing by conductor C$^2$, contacts Z' Z$^3$, brush 16, field F$^2$, brush 14, contacts Z$^2$ Z$^4$, brush 17, conductor C$^4$, brush 9, contacts $c^{19}$ $c^{21}$, brush 10, and armature A$^2$ to ground, the two motors as a whole being in parallel.

It will be observed, therefore, from the foregoing and from an analysis of Fig. 3 that starting with the motors connected in series with each other and with artificial resistance I gradually cut out the resistance as the counter electromotive force increases, removing it entirely when the motor speed and the developed counter electromotive force becomes sufficiently high to permit the motors to be connected directly to the circuit. I next by a series of subordinate changes of temporary character decrease the resistance of the motor-circuit by short-circuiting and cutting out the elements of one motor, again increasing the resistance by reconnecting in the armature previously cut out preparatory to making the first multiple connection, reached in position No. 7, in which the fields are in multiple with the armatures in series, the effect of which is a considerable acceleration of speed, controlled, however, by the series connection of the armatures. I then again reduce the resistance of the circuit by cutting out successively one field and one armature, reconnecting in the previously-cut-out field before making the next running position, wherein the two fields are in series with the two armatures in parallel. (Position No. 10.) This position results in a further considerable acceleration of speed, but controlled by the series connection of the fields. I then again effect further subordinate changes, in which one armature and one field are successively cut out preparatory to passing to the final position, in which the two motors as a whole are connected in multiple.

The temporary or passover positions above described I prefer to employ in passing from one to another of the comparatively-permanent positions; but they may be omitted, as will appear from the description hereinafter given of the modified controller shown in Fig. 2. The other or comparatively-permanent conditions are known as "running" positions—that is to say, they are conditions which afford successive regulating steps and may be maintained so long as it is desired to proceed at the rate of speed which they severally give. It will also be observed that each particular group of contacts has its particular function to perform and although interrelated with adjacent groups is to some extent an independent switch. Group No. 1 forms one terminal of the motor-circuit. It also controls the resistance and operates as a field-paralleling and shunt switch. Group No. 2 operates to connect the two fields in series. Group No. 3 controls the connections of armature A'. Group No. 4 controls the connection between the field and armature of the motor A$^2$ F$^2$. Group No. 5 controls the series connection of the two motors as a whole. Contact $c^{24}$ operates as a grounding-switch for the armature A'.

In the modification shown in Fig. 2 the connections are the same as in Fig. 1 and the general construction of the controller is also the same. The arrangement and area of the contacts are, however, somewhat modified. In place of the single extended contacts $c'$ $c^5$ of the first group I provide shorter separated contacts $c^a$ $c^b$ $c^c$ $c^d$ and $c^e$ $c^f$ $c^g$ $c^h$, respectively. Contacts $c^6$ $c^7$ $c^8$ $c^9$ $c^{13}$ $c^{16}$ $c^{18}$ $c^{20}$ $c^{23}$ $c^{24}$ are made shorter, and instead of the long contacts $c^{19}$ $c^{21}$ shorter separated contacts $c^i$ $c^j$ and $c^k$ $c^l$ are employed. In place of the long contacts $c^{22}$ two shorter separated contacts $c^m$ $c^n$ are provided. The connections remain the same as in Fig. 1. The effect of these changes, as will readily appear without tracing out the several positions in detail, is to eliminate positions 5, 5ᵃ, 6, 6ᵃ, 7ᵃ, 8, 8ᵃ, 9, 9ᵃ, 10ᵃ, 11, and 11ᵃ, leaving positions 1, 2, 3, 4, 7, 10, and 12 the same as with the controller shown in Fig. 1. In other words, after cutting out the external resistance the two fields are first connected in parallel, their series connection is then restored, and the two armatures are connected in parallel, and, lastly, the two motors as a whole are connected in parallel. These, in fact, are the essential positions involved in the operation of the controller shown in Fig. 1, the intermediate steps there shown being for the purpose of preventing quite as abrupt changes and obtaining a more gradual acceleration of speed. In lieu of these changes in the controller shown in Fig. 2 the circuit through the controller and the motors is momentarily broken in passing from one position to the next.

I do not claim herein broadly a method or means of controlling or accelerating a plurality of motors which involves in passing from series to parallel relation and intermediate relation in which an element of one motor is first connected in multiple into a corresponding element of the other motor or motors, as I believe that to be the invention of W. R. Hamlen, of Johnstown, Pennsylvania. I do not, however, desire to be limited to immaterial details not essential to the scope of my invention as set forth in the appended claims.

The means herein described for carrying into effect my novel method of control form the subject-matter of a separate application to be filed.

Having thus described my invention, what I claim as new, and desire to protect by Letters Patent, is—

1. The method of accelerating a plurality of electric motors, which consists in shifting them from series to parallel relation by first connecting one element of each in multiple with the corresponding element of the other or others with the remaining elements in series, and then reversing such relation by circuit changes wherein the multiple-connected elements are coupled in series and the series-connected elements are coupled in parallel, and finally coupling the two motors as a whole in parallel.

2. The method of accelerating a plurality of electric motors, which consists in starting with the motors connected in series, then connecting the fields in parallel with the armatures in series, then reversing this relation by connecting the fields in series with the armatures in parallel, and finally connecting the motors as a whole in parallel.

3. The method of accelerating a plurality of electric motors, which consists in starting them in series, then cutting out one motor, and subsequently again connecting it in circuit with its field in parallel with that of the other motor, and its armature in series with that of the other motor, then reversing this relation by circuit changes whereby the two fields are connected in series with the two armatures in parallel, and finally connecting the two motors as a whole in parallel.

4. The method of accelerating a plurality of electric motors, which consists in starting them in series, then connecting their fields in parallel with their armatures in series, then successively cutting out the elements of one motor, and reconnecting them in circuit with the two fields in series and the armatures in parallel, then again successively cutting out the elements of one motor, and finally connecting the two motors as a whole in parallel.

5. The method of accelerating a plurality of electric motors, which consists in starting them in series, then cutting out one motor, and reconnecting its elements in circuit with the other motor with the two fields in multiple and the two armatures in series, then again cutting out one motor, and subsequently reconnecting its elements in series with the other motor with the two fields in series and the two armatures in parallel, then again cutting out one motor, and finally connecting the two motors as a whole in parallel.

6. The method of shifting two motors from series to parallel, which consists in short-circuiting and then cutting out one motor, then connecting in its armature in series with the armature of the other motor, and its field-windings in parallel with those of the other motor, then again gradually cutting out one motor, and subsequently again connecting it in circuit with the other motor with the two fields in series and their armatures in multiple, then again gradually cutting out one motor and finally again connecting it in circuit with the two motors as a whole in parallel.

7. The method of accelerating a plurality of electric motors, which consists in starting them in series with each other and with external resistance, gradually cutting out said resistance, then effecting circuit changes by which one element is connected in parallel with the corresponding element of the other motor or motors, with the other elements in series then reversing this relation by effecting circuit changes to couple the series-connected elements in parallel and the parallel-connected elements in series and finally connecting the two motors as a whole in parallel.

8. The method of accelerating a pair of electric motors which consists in starting them in series with each other and with artificial resistance, then gradually cutting out the resistance, then effecting circuit changes to connect the two fields in parallel with the two armatures in series, then effecting further changes to connect the two fields in series and the two armatures in multiple, and finally connecting the two motors as a whole in parallel.

9. The method of accelerating a pair of electric motors, which consists in starting them in series, then effecting circuit changes by which the fields are connected in parallel and the armatures in series, then reversing the relation by changes which connect the fields in series and the armatures in parallel, and finally connecting the two motors as a whole in parallel, one motor intermediate of each of said changes being momentarily cut out of circuit.

10. The method of accelerating a pair of electric motors, which consists in starting them all in series, then cutting out one motor and reconnecting its elements in circuit with the field-coils of the two motors in parallel and their armatures in series with each other and with the fields, then again cutting out one motor and reconnecting its elements in circuit with the field-coils in series and the armatures in parallel, then breaking the circuit through the armature of one motor, and subsequently the circuit through one field, and finally connecting the two motors as a whole in parallel.

In testimony whereof I have affixed my signature in presence of two witnesses.

FRANK A. MERRICK.

Witnesses:
RICHARD EYRE,
H. W. SMITH.